(12) United States Patent
Vincent et al.

(10) Patent No.: US 10,433,170 B2
(45) Date of Patent: Oct. 1, 2019

(54) SUBSCRIBER IDENTITY PATTERN

(71) Applicant: Hewlett Packard Enterprise Development LP, Houston, TX (US)

(72) Inventors: Mario Bertram Vincent, Bangalore (IN); Prasad Vithal Shetty, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/566,620

(22) PCT Filed: Oct. 12, 2015

(86) PCT No.: PCT/US2015/055061
§ 371 (c)(1),
(2) Date: Oct. 13, 2017

(87) PCT Pub. No.: WO2016/167834
PCT Pub. Date: Oct. 20, 2016

(65) Prior Publication Data
US 2018/0098216 A1 Apr. 5, 2018

(30) Foreign Application Priority Data

Apr. 13, 2015 (IN) .......................... 1910/CHE/2015

(51) Int. Cl.
*H04W 12/06* (2009.01)
*H04W 8/18* (2009.01)
(Continued)

(52) U.S. Cl.
CPC ............ *H04W 12/06* (2013.01); *H04W 4/70* (2018.02); *H04W 8/04* (2013.01); *H04W 8/18* (2013.01); *H04W 8/20* (2013.01)

(58) Field of Classification Search
CPC .............................. H04W 12/12; H04W 8/12
See application file for complete search history.

(56) References Cited

U.S. PATENT DOCUMENTS 8,725,140 B2 5/2014 Mohammed et al.
8,750,123 B1 6/2014 Alisawi
(Continued)

FOREIGN PATENT DOCUMENTS

EP          2259611 A1   12/2010
WO    WO-2010072242 A1   7/2010
(Continued)

OTHER PUBLICATIONS

International Search Report and Written Opinion, International Application No. PCT/US2015/055061, dated Jan. 27, 2016, pp. 1-13, KIPO.

(Continued)

*Primary Examiner* — Charles N Appiah
*Assistant Examiner* — Frank E Donado
(74) *Attorney, Agent, or Firm* — Hewlett Packard Enterprise Patent Department

(57) ABSTRACT

A attach request for a device may be received. The request may include a subscriber identity for the device. The subscriber identity may be matched to a subscriber identity pattern. The subscriber identity pattern may be used to retrieve a subscriber record. Subscriber data from the subscriber record may be returned in response to the attach request.

12 Claims, 6 Drawing Sheets

(51) Int. Cl.
*H04W 8/04* (2009.01)
*H04W 4/70* (2018.01)
*H04W 8/20* (2009.01)

(56) References Cited

U.S. PATENT DOCUMENTS

| | | |
|---|---|---|
| 8,755,799 B1 | 6/2014 | Tiraspolsky |
| 8,868,041 B2 | 10/2014 | O'Leary |
| 2004/0047332 A1 | 3/2004 | Bensimon et al. |
| 2009/0300217 A1* | 12/2009 | Patel ............... H04L 29/12311 709/245 |
| 2010/0146610 A1 | 6/2010 | Kim et al. |
| 2010/0273462 A1* | 10/2010 | Thorn .................. H04W 8/26 455/414.1 |
| 2011/0047256 A1* | 2/2011 | Babu ............... H04L 29/12367 709/223 |
| 2013/0136072 A1 | 5/2013 | Bachmann et al. |
| 2013/0288678 A1 | 10/2013 | Lott et al. |
| 2014/0179314 A1 | 6/2014 | Tiraspolsky |
| 2014/0286199 A1 | 9/2014 | Li et al. |
| 2014/0323080 A1* | 10/2014 | Mishkin ............... H04L 12/14 455/405 |
| 2015/0133052 A1* | 5/2015 | Reunamaki ........... H04W 76/18 455/41.2 |
| 2015/0350899 A1* | 12/2015 | Hwang ................ H04W 12/06 455/411 |

FOREIGN PATENT DOCUMENTS

| | | |
|---|---|---|
| WO | WO-2012000161 A1 | 1/2012 |
| WO | WO-2014149059 A1 | 9/2014 |

OTHER PUBLICATIONS

Kuboye B.M. et al., "Development of Models for Managing Network Congestion on Global System for Mobile Communication (GSM) in Nigeria," Journal of Wireless Networking and Communications, Dec. 21, 2011, pp. 8-15, Scientific & Academic Publishing.

3GPP Organizational Partners, "3rd Generation Partnership Project; Technical Specification Group Services and System Aspects; System Improvements for Machine-Type Communications," Technical Report, 3GPP TR 23.888, Sep. 2012, pp. 1-165, Release 11, V11.0.0.

Extended European Search Report, EP Application No. 15889419.6, dated Mar. 20, 2018, pp. 1-12, EPO.

* cited by examiner

SUBSCRIBER IDENTITY PATTERN

BACKGROUND

Machine Type Communications (MTC) enables machines to communicate directly with one another in a machine to machine (M2M) fashion. For example, MTC is a foundational technology for the Internet of Things (IoT), the network of physical objects embedded with electronics and connectivity.

DETAILED DESCRIPTION OF SPECIFIC EXAMPLES

Cellular network communications are often used for MTC. Existing cellular networks, such as Global System for Mobile Communications (GSM) standard based networks, $3^{rd}$ Generation Partnership Project (3GPP) standard based networks, or Long Term Evolution (LTE) standard based networks, are designed to provide human voice and data communications. Operational, sizing, provisioning, and billing models may be based on the assumption that devices connect to the network for a long duration, each device is associated with a unique subscription, and each subscription is associated with a fixed address. For example, a subscriber data server, such as a home location register (HLR) or home subscriber server (HSS), may store a separate record for each subscriber device, typically keyed by an International Mobile Subscriber Identity (IMSI) stored on a subscriber identity module (SIM).

Aspects of the disclosed technology may allow a single subscription record to control a group of devices. The devices may be configured to be normally disconnected from the network and to only connect for short intervals at random times. For example, the devices may use their connection times to upload data, download instructions, or perform other periodic communications as necessary for their specific applications. Accordingly, a single subscription may support a large group of M2M devices, such as IoT devices. In some cases, the disclosed technology may be implemented in existing networks, such as existing GSM, 3GPP, or LTE standards.

Figure 1:
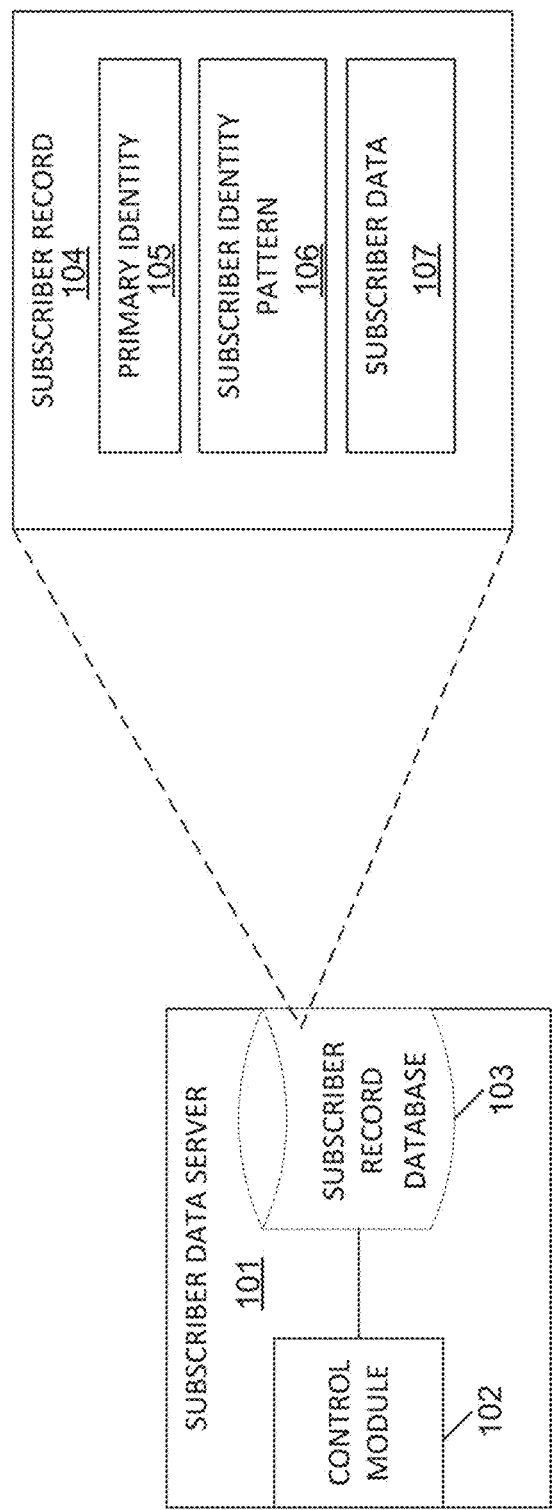
FIG. 1 illustrates an example subscriber data server including a subscriber record database.

FIG. 1 illustrates an example subscriber data server 101 including a subscriber record database 103. For example, the subscriber data server 101 may be an HSS, an HLR, or a combined HSS/HLR system. In some implementations, the server 101 may be distributed across one or more physical or virtual machines. For example, the control module 102 and the subscriber record database 103 may be distributed across a group of physical server machines. Additionally, the illustrated functional modules may be implemented as software stored on a non-transitory computer readable medium, as hardware, or as a combination thereof.

The example subscriber record database 103 may store a subscriber record 104. The subscriber record 104 may include a primary subscriber identity 105. For example, the primary subscriber identity 105 may be a primary IMSI used as a key for the subscriber record 104. As other examples, the primary subscriber identity 105 may be an MSISDN associated with the subscriber record 104, an IPv6 address for a device within a group of devices controlled by the record 104, or any other unique key associated with the group of devices.

The subscriber record 104 may further include a subscriber identity pattern 106. The subscriber identity pattern 106 may be an information element that encompasses a range of different subscriber identities. The size of the range may determine the maximum number of devices that may be covered by a single subscriber record 104. In some implementations, the subscriber identity pattern 106 may be a wildcard element. For example, an IMSI wildcard such as 18121237??? would encompass IMSIs from 18121237000 to 18121237999. As another example, the subscriber identity pattern 106 may be a pair of elements that encompass a range of different subscriber identities. For example, the pattern 106 may be an IMSI along with a range size, such as (18121237000, 1000) would encompass IMSIs from 18121237000 to 18121237999. As a further example, the subscriber identity pattern 106 may be a range size associated with the primary subscriber identity 105 to encompass a range of different subscriber identities. For example, the pattern 106 may be a range such as 500. For a primary subscriber identity 105 of 18121237000, the pattern 106 of 500 would cover IMSIs from 18121237000 to 18121237499.

In some implementations, the size of the range covered by the subscriber identity pattern 106 may vary between different subscriber records 104. For example, a single group of devices may share a single subscriber record 104 and the range size may be configured according to the group size. In other implementations, the range size may be the same for all records 104. For example, each record may have a subscriber identity wildcard element with an equal number of wildcard characters.

The subscriber record 104 may further store a set of subscriber data 107 for the group of devices covered by the record 104. In some implementations, the subscriber data 107 may be various subscriber profile data stored in an HLR or HSS to enable devices to connect to cellular networks. For example, the subscriber profile data may include allowed access types, barred or allowed services, or other service features. The subscriber data 107 may also include information to assist the server in managing group of devices. For example, the subscriber data 107 may include a timeout period which defines a minimum time for which a device of the group is allowed to connect to the network. For example, the timeout period may be provisioned based on the needs of the devices served by the record. For example, a timeout period of 30 seconds would allow a maximum of 2 devices per minute, or 1440 device connections in a 12 hour slot, which would allow a 1000 device group to connect twice a day. As another example, the subscriber data 107 may include transient information such as the identity of a currently connected device and a timer of how long that device has been connected.

The example subscriber data server 101 may further include a control module 102. For example, the control module 102 may be implemented as software stored on a non-transitory computer readable medium and executed by a processor, as hardware, or as a combination thereof. For example, the control module 102 may implement the functionality of an HLR supporting a GSM or other cellular standard network, an HSS supporting an LTE or other network, or a combined HSS/HLR supporting multiple protocols on a network.

The control module 102 may receive an attach request for a device. For example, the attach request may be any message sent to the server 101 as part of a device attach or location update procedure. For example, the attach request may be an authentication message or location update request sent by a serving general packet radio service (GPRS) support node (SGSN), or a visitor location register/mobile service center (VLR/MSC) to an HLR. As another example, the attach request may be an authentication message or location update request sent by a mobile management entity (MME) to an HSS). The request may include a subscriber identity for the device, which may be different than the primary subscriber identity of a record 104 stored on the subscriber record database 103.

The control module 102 may retrieve a subscriber record 104 for the device by matching the identity in the request to a subscriber identity pattern 106 of a subscriber record 104. For example, the control module 102 may search the subscriber database 103 for a subscriber record 104 having a subscriber identity pattern 106 that encompasses the subscribed identity. The control module 102 may further determine a primary subscriber identity 105 that corresponds to the matched subscriber identity pattern 106.

The control module 102 may retrieve the subscriber data 107 from the subscriber record 104 using the primary subscriber identity 105 as a key. Alternatively, the control module 102 may retrieve the subscriber data 107 from the subscriber record 104 using the pattern 106 as a key. The control module 102 may then return the subscriber profile data 107 from the subscriber data 107. For example, the control module 102 may return the subscriber profile data 107 as an update location message.

The server 101 may receive a second attach request for a second device in the group of devices covered by the record 104. For example, the server 101 may receive the second attach request while the first device is still attached to the network. The server 101 may reject the connection attempt unless the timeout period following the first device's connection time has elapsed. If the first device's connection has exceeded the timeout period, then the sever 101 may cancel the first connection and allow the second device to attach.

For example, the control module 102 may receive a second attach request for a second device, the second request including a second subscriber identity matching the subscriber identity pattern. If the first device has been connected for at least a timeout period, the control module 102 may disconnect the first device. For example, the control module 102 may disconnect the first device by transmitting a cancel location message to the SGSN or MME currently supporting the first device. Additionally, the control module may return the subscriber data from the subscriber record to allow the second device to connect. For example, the control module may return the subscriber data as part of an update location message for the second device. If the first device has been connected for less than the timeout period, the control module 102 may transmit a refusal to the attach request. The second device may then try to connect later. For example, the second device may wait for a random back off time and attempt to reconnect after the back off period.

Figure 2:
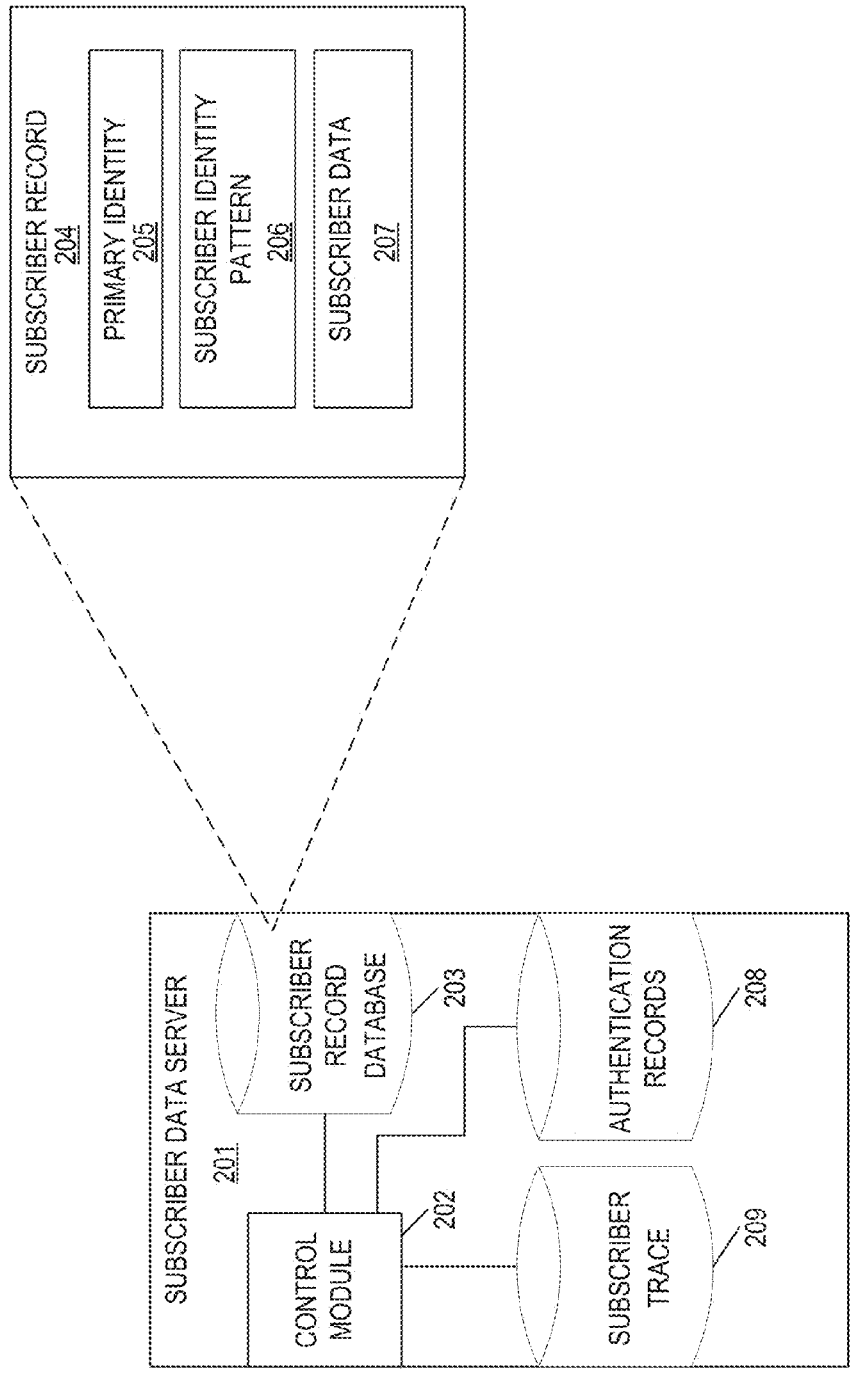
FIG. 2 illustrates a subscriber data server including an authentication database and a subscriber trace.

FIG. 2 illustrates a subscriber data server 201 including an authentication database 208 and a subscriber trace 209. The server 201 may be an implementation of a server described with respect to FIG. 1. For example, the control module 202, subscriber record database 203, subscriber record 204, primary identity 205, subscriber identity pattern 206, and subscriber data 207 may be as described with respect to control module 102, subscriber record database 103, subscriber record 104, primary identity 105, subscriber identity pattern 106, and subscriber data 107 of FIG. 1, respectively.

In some implementations, the subscriber data server 201 may maintain a single authentication record for a plurality of subscriber identities matching the subscriber identity pattern. In this situation, the authentication information on the SIM cards of the devices served by a subscriber record 204 would be shared. For example, a SIM manufacturer may manufacture such custom SIM cards for a particular M2M deployment. In these implementations, the authentication record database 208 may store the single authentication record for the plurality of subscriber identities matching the subscriber identity pattern. For example, the authentication record may be keyed by the primary identity 205 or the subscriber identity pattern 206 of the corresponding subscriber record 204. In these implementations, during authentication, the control module 202 may retrieve authentication information keyed to the primary subscriber identity 205 or the subscriber identity pattern 206. The control module 202 may then return the retrieved information in an authentication response with the connecting device's identity.

In other implementations, the subscriber data server 201 may maintain separate authentication records for each subscriber identity served by a subscriber record 204. For example, this may accommodate the situation where each SIM card contains unique authentication information. In these implementations, the server 201 may maintain each authentication record keyed to the individual device's identity, such as its IMSI. In these implementations, during authentication, the control module 202 may retrieve the authentication information keyed to the connecting device's identity and return it in a message containing the same identity.

In some implementations, the subscriber data server 201 may include a log, such as a subscriber trace log. Records within the log may be keyed by device subscriber identity and may include connection attempt times for a device, successful connection times and connection time lengths, disconnection times, corresponding primary subscriber identities, or other useful information for tracking the behavior of devices served by a subscriber record 204.

Figure 3:
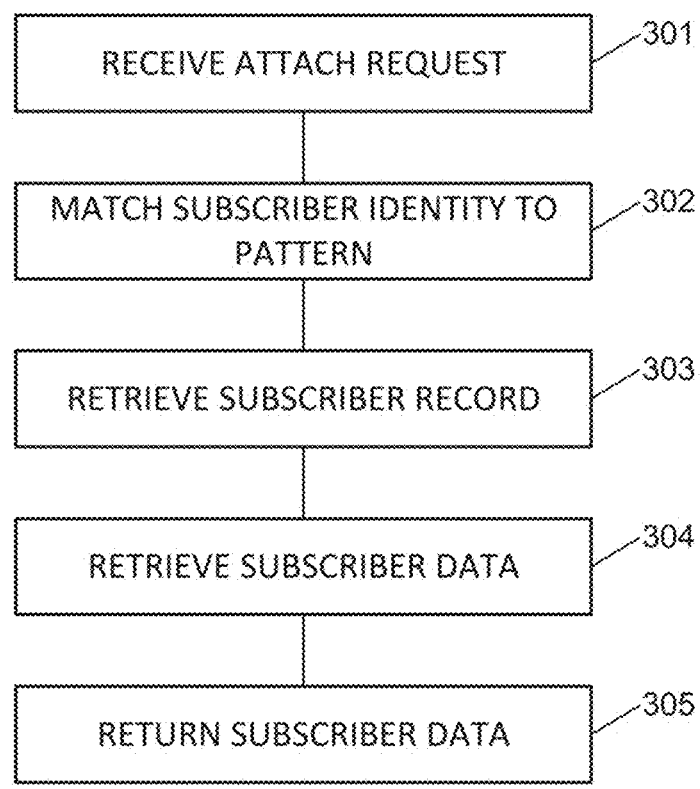
FIG. 3 illustrates an example method of returning subscriber data using a subscriber identity pattern.

FIG. 3 illustrates an example method of returning subscriber data using a subscriber identity pattern. In some implementations, the example method may be performed by an HLR or an HSS. For example, the method of FIG. 3 may be implemented during operation of a subscriber data server such as the subscriber data server 101 of FIG. 1 or the subscriber data server 201 of FIG. 2.

The example method may include block 301. Block 301 may include receiving an attach request for a device, the request including a subscriber identity for the device. For example, the attach request may be any message sent to the server as part of a device attach or location update procedure. For example, the attach request may be an authentication message or location update request sent by a serving general packet radio service (GPRS) support node (SGSN), or a visitor location register/mobile service center (VLR/

MSC) to an HLR. As another example, the attach request may be an authentication message or location update request sent by a mobile management entity (MME) to an HSS). The request may include a subscriber identity for the device, such as an IMSI or MSISDN of the device.

The example method may further include block 302. Block 302 may include matching the subscriber identity to a subscriber identity pattern. For example, the subscriber identity pattern may be a wildcard field stored within a subscriber record of a subscriber profile database. Matching the subscriber identity may include matching a stored wildcard to the subscriber identity.

The example method may further include block 303. Block 303 may include retrieving a subscriber record using the subscriber identity pattern. For example, block 303 may include using the subscriber identity pattern as a key to a subscriber record. As another example, block 303 may include using the subscriber identity pattern to determine a primary subscriber identity associated with the subscriber identity pattern and using the primary subscriber identity as a key to the subscriber record.

The example method may further include block 304. Block 304 may include retrieving subscriber data from the subscriber record. For example, the subscriber data may include subscriber profile data that is shared by a group of devices having identities that match the subscriber identity pattern. For example, the subscriber profile data may include information provided by an HLR or HSS to an SGSN or MME during attach or update procedures.

The example method may further include block 305. Block 305 may include returning the subscriber data. For example, block 305 may include returning the subscriber data as a response to the attach request received in block 301. The response may include the device identity received in the attach request along with the subscriber data keyed to the primary subscriber identity.

Figure 4:
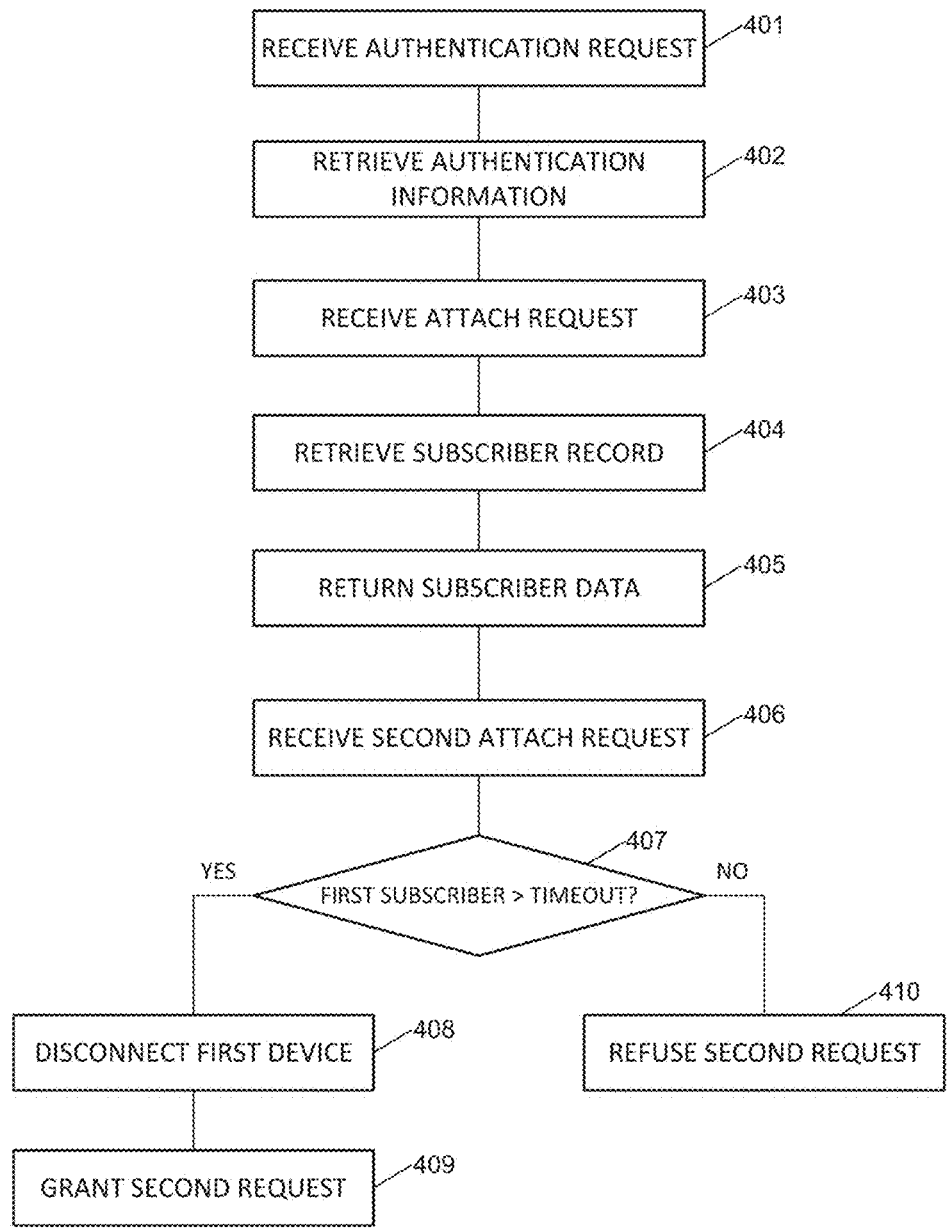
FIG. 4 illustrates an example method of managing connections of devices served by a common subscriber record.

FIG. 4 illustrates an example method of managing connections of devices served by a common subscriber record. In some implementations, the example method may be performed by an HLR or an HSS. For example, the method of FIG. 4 may be implemented during operation of a subscriber data server such as the subscriber data server 101 of FIG. 1 or the subscriber data server 201 of FIG. 2.

The example method may include block 401. Block 401 may include receiving an authentication request. The authentication request may include a device identity, such as an IMSI, of a first device that is managed by a shared subscriber record. For example, the authentication request may be sent by an SGSN, or an MSC/VLR during an initial network attach or location update procedure.

The example method may also include block 402. Block 402 may include obtaining the requested authentication information for the device from an authentication record database. Block 402 may further include returning the authentication information as a response to the authentication request received in block 401.

In some implementations, block 402 may include matching the device identity from the authentication request to a subscriber identity pattern. In this example, block 402 may include retrieving authentication information based on the subscriber identity pattern. In this case, the authentication information may be shared between devices matching the subscriber identity pattern. As another example, block 402 may include using the subscriber identity pattern to retrieve a primary subscriber identity for a shared subscriber record, and using the primary subscriber identity as a key to the shared authentication information.

In other implementations, block 402 may include using the device identity from the authentication request as a key to the authentication information. In these implementations, the authentication information may be unique to the device.

The example method may further include block 403. Block 403 may include receiving an attach request for the first device. For example, block 403 may be performed as described with respect to block 301 of FIG. 3.

The example method may further include block 404. Block 404 may include retrieving a subscriber record shared by the first device and other devices of a group of devices. For example, block 404 may be performed as described with respect to blocks 303 and 303 of FIG. 3.

The example method may further include block 405. Block 405 may include returning subscriber data retrieved from the subscriber record retrieved in block 404. For example, block 405 may be performed as described with respect to block 304 of FIG. 3.

The example method may further include block 406. Block 406 may include receiving a second attached request for a second device. The second request may include a second subscriber identity, such as a second IMSI, for the second device. The second device may be another device in a group of devices sharing the subscription record with the first device. In this case, the second subscriber identity will match the subscriber identity pattern of the subscriber record retrieved in block 404.

The example method may further include block 407. Block 407 may include determining if the first device has been connected for at least a timeout period. For example, the timeout period may be retrieved from the subscriber record retrieved in block 404. Additionally, the time for which the first device has been connected may be stored as temporary data in the subscriber record.

If the first device has been connected for at least a timeout period, then blocks 408 and 409 may be performed. If the first device has been connected for less than the timeout period then block 410 may be performed.

Block 408 may include disconnecting the first device. For example, block 408 may include transmitting a cancel location message to the SGSN or MSC/VLR to which the first device is currently associated.

Block 409 may include granted the second attach request. for example, block 409 may include returning the subscriber data as a response to the second attach request 406 as described with respect to block 405.

Block 410 may include refusing to grant the second attach request. For example, block 410 may include transmitting a refusal as a response to the second attach request received in block 406.

Figure 5:
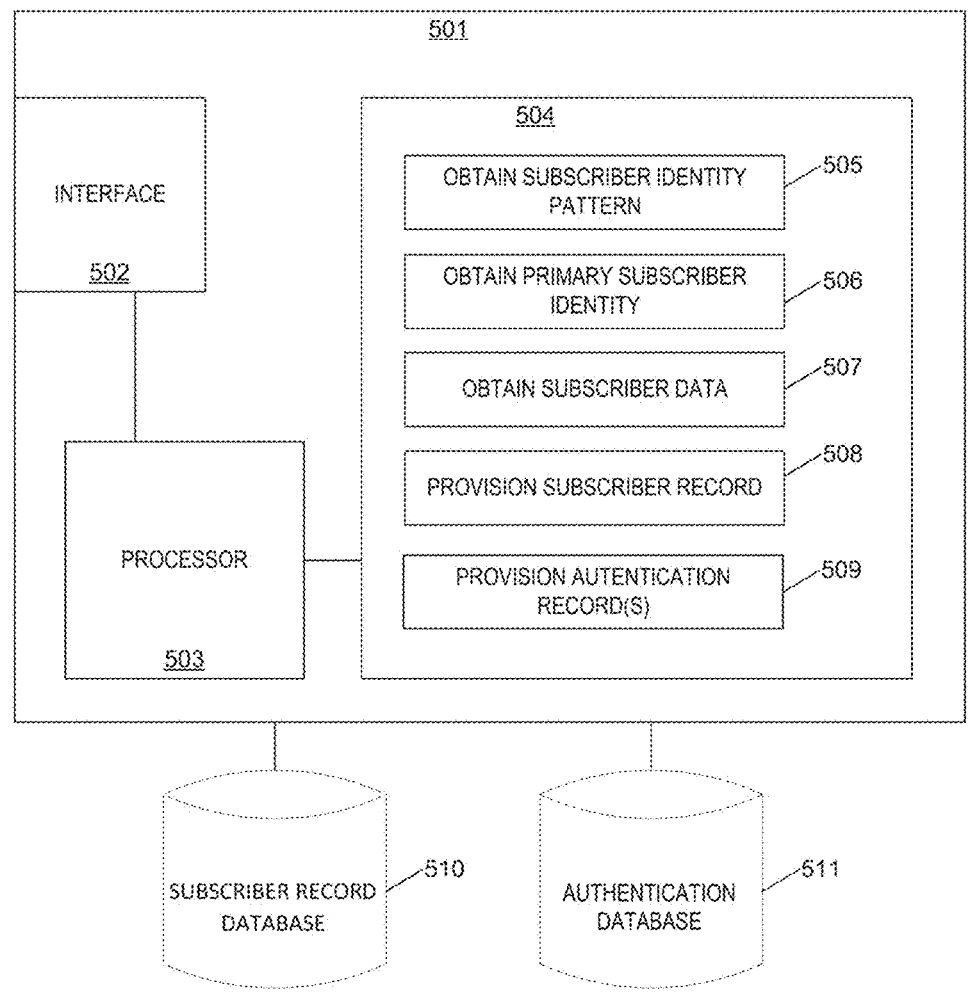
FIG. 5 illustrates an example subscriber data server including computer executable instructions to provision a shared subscriber record.

FIG. 5 illustrates an example subscriber data server 501 including computer executable instructions to provision a shared subscriber record. For example, the data server 501 may be an HLR or HSS and may be an implementation of the servers described with respect to FIGS. 1 and 2.

The server 501 may include a non-transitory computer readable medium 504. For example, the medium 504 may include memory such as random access memory (RAM), storage such as hard disk, or solid state storage, or a combination thereof.

The medium 504 may store a first set of instructions 505 that are executable by a processor 503. The first set of instructions 505 may be executed to obtain a subscriber identity pattern. For example, the subscriber pattern may be a wildcard field or other information element that covers a range of subscriber identities. For example, the subscriber identity pattern may be as described with respect to pattern 106 of FIG. 1. In some cases, the instructions 505 may be executable to retrieve the subscriber pattern from a user through a provisioning user interface 502. In other cases, the instructions 505 may be executable to generate the subscriber pattern from other information, such as a primary subscriber identity key received through the interface 502.

The medium 504 may store a second set of instructions 506 that are executable by the processor 503. The instructions 506 may be executable to obtain a primary subscriber identity corresponding to the subscriber identity pattern. For example, the primary subscriber identity may be as described with respect to identity 105 of FIG. 1 and may serve as a key for the shared subscriber record. In some cases, the instructions 506 may be executable to generate the primary subscriber key from the subscriber identity pattern. In other cases, the instructions 506 may be executable to receive the primary subscriber key via the interface 502.

The medium 504 may store a third set of instructions 507 that are executable by the processor 503. The instructions 507 may be executable to obtain subscriber data for a set of devices having subscriber identities matching the subscriber identity pattern. For example, the subscriber data may be as described with respect to subscriber data 107 of FIG. 1. In some implementations, the data 107 may be received via the provisioning user interface 502.

The medium 504 may store a fourth set of instructions 508 that are executable by the processor 503. The instructions 508 may be executable to provision a subscriber record keyed to the primary subscriber identity and including the subscriber identity pattern and the subscriber data. For example, the instructions 508 may be executable to use the obtained information to create a subscriber record and store the subscriber record on a subscriber record database 510. For example, the subscriber record may be as described with respect to subscriber record 104 of FIG. 1 and the subscriber record database 501 may be as described with respect to database 103.

The medium 506 may also store a fifth set of instructions 509. The instructions 509 may be executable to provision authentication records for the subscribers in an authentication database 511. For example, the authentication records and database 511 may be as described with respect to authentication records 208 of FIG. 2. In some cases, the instructions 509 may be executable to provision separate authentication records for a set of devices matching the primary subscriber identity.

Figure 6:
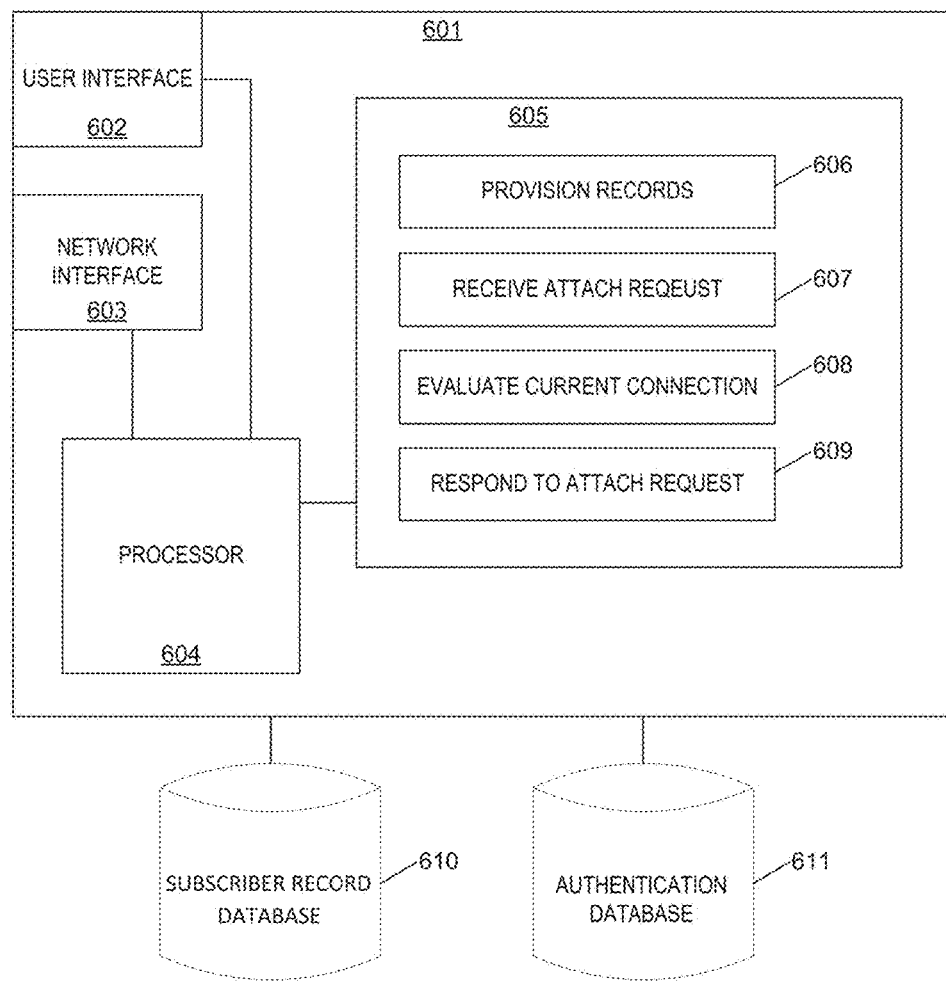
FIG. 6 illustrates an example subscriber data server including computer executable instructions for managing connection status of groups of devices sharing subscriber records.

FIG. 6 illustrates an example subscriber data server 601 including computer executable instructions for managing connection status of groups of devices sharing subscriber records. For example, the data server 601 may be an HLR or HSS and may be an implementation of the servers described with respect to FIGS. 1, 2, and 5.

The example server 601 may include a non-transitory computer readable medium 605. For example, the medium 605 may include memory such as random access memory (RAM), storage such as hard disk, or solid state storage, or a combination thereof.

The medium 605 may store a first set of instructions 606. Instructions 606 may be executable by a processor 604 to receive information for shared subscriber records and authentication records via a user interface 602. Instructions 606 may be further executable by the processor 604 to provision the corresponding records in a subscriber record database 610 and an authentication database. For example, instruction set 606 may be as described with respect to instructions 505-509 of FIG. 5.

Medium 605 may further store instruction set 607. Instruction set 607 may be executable by the processor 604 to receive an attach request via a network interface for a subscriber device. The attach request may be for a requesting device having a first subscriber identity matching a subscriber identity pattern of a subscriber record. In some cases, a currently attached subscriber device may be connected to the cellular network using the subscriber record. Accordingly, the currently attached subscriber device may have a second subscriber identity matching the subscriber identity pattern.

Medium 605 may store instruction set 608. Instruction set 608 may be executable by the processor 604 to evaluate the connection time of the currently attached subscriber device. For example, instruction set 608 may be executable to retrieve a current connection length of the current device from the subscriber record and to compare that connection length to a timeout period. In some cases, the timeout period may be stored in the subscriber record.

Medium 605 may store instruction set 609. Instruction set 609 may be executable to respond to the attach request according to the connection length of the currently attached device. For example, if the currently attached device has been attached for less than the timeout period, the instructions 609 may be executable to deny the attach request. If the currently attached device has been attached for more than the timeout period, the instructions 609 may be executable to disconnect the currently attached device and grant the attach request. For example, the instructions 609 may be executable to cause the server 601 to transmit a cancel location message for the first device and to transmit an update location message for the second device.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A subscriber data server, comprising:

a subscriber record database to store a subscriber record comprising a primary subscriber identity, a subscriber identity pattern covering a range of subscriber identities, including a range size associated with the primary subscriber identity to encompass a range of different subscriber identities, and subscriber data including subscriber profile data, the subscriber data including various subscriber profile data stored in a Home Location Register (HLR) to enable devices to connect to cellular networks; and control software stored on a non-transitory computer readable medium to:

receive an attach request for a device as part of a location update procedure, the request including a subscriber identity for the device, and the subscriber identity being different than the primary subscriber identity;

retrieve the subscriber record by matching the subscriber identity to the subscriber identity pattern when the subscriber identity is within the range of subscriber identities; and return the subscriber profile data from the subscriber record, wherein the control software is to:
receive a second attach request for a second device while the first device is still attached to the network, the second request including a second subscriber identity matching the subscriber identity pattern; and
when the first device has been connected for at least a minimum period of time:
disconnect the first device and return the subscriber data from the subscriber record to allow the second device to connect.

2. The subscriber data server of claim 1, further comprising:
an authentication record database to store a single authentication record for a plurality of subscriber identities matching the subscriber identity pattern.

3. The subscriber data server of claim 1, further comprising:
an authentication record database to store a separate authentication record for separate subscriber identities matching the subscriber identity pattern.

4. The subscriber data server of claim 1, further comprising:
a log to store, for a device, connection attempt times, connect times, disconnect times, device subscriber identity, and primary subscriber identity.

5. A method, comprising:
receiving an attach request for a device as part of a location update procedure, the request including a subscriber identity for the device;
matching the subscriber identity to a subscriber identity pattern by determining when the subscriber identity is within a range of subscriber identities covered by the subscriber identity pattern;
retrieving a subscriber record using the subscriber identity pattern;
retrieving subscriber data from the subscriber record, the subscriber data including subscriber profile data and various subscriber profile data stored in a Home Location Register (HLR) to enable devices to connect to cellular networks; and
returning the subscriber data, wherein the method further includes:
receiving a second attach request for a second device while the first device is still attached to the network, the second request including a second subscriber identity for the second device matching the subscriber identity pattern; and
when the first device has been connected for at least a minimum period of time:
disconnecting the first device and returning the subscriber data from the subscriber record in a response to the second attach request to allow the second device to connect.

6. The method of claim 5, further comprising:
retrieving authentication information keyed to the primary subscriber identity or the subscriber identity pattern, the authentication information being shared between devices matching the subscriber identity pattern; and
returning the authentication information.

7. The method of claim 5, further comprising:
retrieving authentication information keyed to the subscriber identity for the device, the authentication information being unique to the device; and
returning the authentication information.

8. The method of claim 5, further comprising: when the first device has been connected for less than the timeout period: returning a refusal to grant the second attach request.

9. The method of claim 5, further comprising retrieving the timeout period from the subscriber record.

10. The method of claim 5, further comprising disconnecting the first device by transmitting a cancel location message to a visitor location register, mobile service center, or serving general packet radio service support node to which the first device is currently associated.

11. A non-transitory computer readable medium storing instructions to:
obtain a subscriber identity pattern corresponding to a range of subscriber identities:
obtain a primary subscriber identity corresponding to the subscriber identity pattern;
obtain subscriber data for a set of devices having subscriber identities within the range of subscriber identities matching the subscriber identity pattern, the subscriber data including subscriber profile data and various subscriber profile data stored in a Home Location Register (HLR) to enable devices to connect to cellular networks;
provision a subscriber record keyed to the primary subscriber identity and including the subscriber identity pattern and the subscriber data
receive an attach request for a requesting device having a first subscriber identity matching the subscriber identity pattern as part of a location update procedure;
determine when a currently attached device having a second subscriber identity matching the subscriber identity pattern has been attached for more than a minimum period of time;
when the currently attached device has been attached for less than the minimum period of time, deny the attach request;
when the currently attached device has been attached for at least the minimum period of time, disconnect the currently attached device, grant the attach request and return the subscriber data from the subscriber record to allow the second device to connect.

12. The non-transitory computer readable medium of claim 11, storing instructions to:
provision separate authentication records for a set of devices matching the primary subscriber identity.

* * * * *